V. E. REICHARD.
EMERGENCY TIRE.
APPLICATION FILED DEC. 13, 1915.
1,200,237.
Patented Oct. 3, 1916.
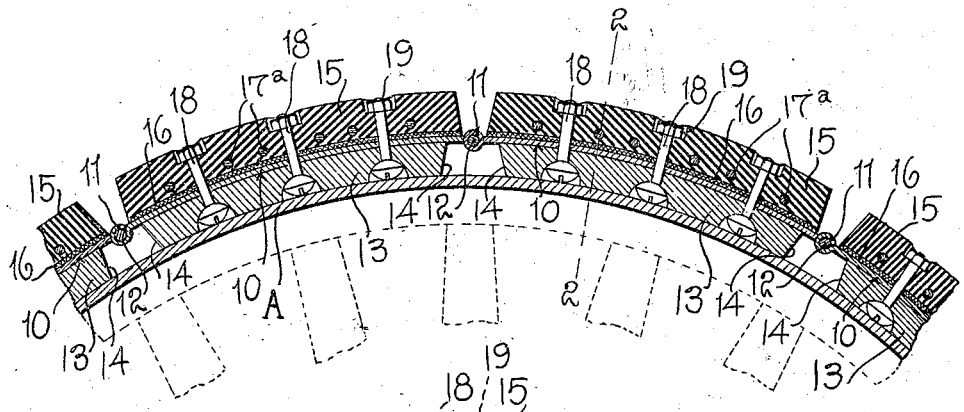
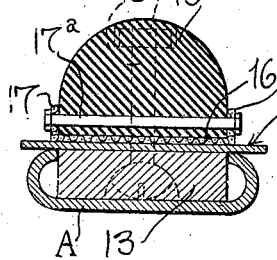
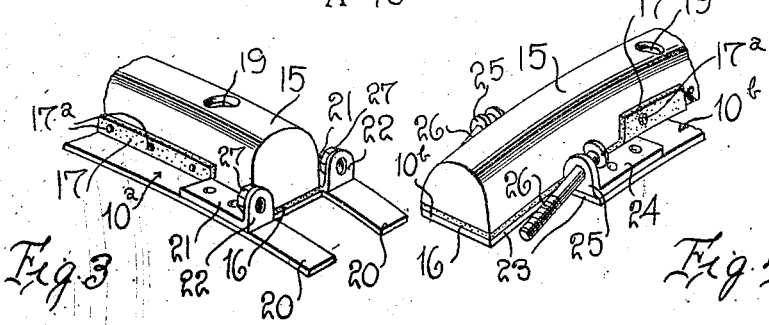
Inventor
V. E. Reichard
By Watson E. Coleman
Attorney

UNITED STATES PATENT OFFICE.

VERN E. REICHARD, OF PERRY, NEW YORK.

EMERGENCY-TIRE.

1,200,237.      Specification of Letters Patent.      Patented Oct. 3, 1916.

Application filed December 13, 1915. Serial No. 66,575.

*To all whom it may concern:*

Be it known that I, VERN E. REICHARD, a citizen of the United States, residing at Perry, in the county of Wyoming and State of New York, have invented certain new and useful Improvements in Emergency-Tires, of which the following is a specification, reference being had to the accompanying drawings.

This invention relates to automobile tires and particularly to an emergency tire which is adapted to be disposed upon the wheel of an automobile in case of an emergency, as when the pneumatic tire is punctured or a blowout occurs.

The general object of my invention is to so construct the emergency tire that it may be disposed upon the rim of the automobile so as to bear upon the flanges of the rim, as well as upon the body thereof and in this connection to provide an emergency tire which will be expansible and contractible so that it may be contracted into place and promptly engaged with the rim of the wheel or can be readily removed.

Still another object of this invention is to provide an emergency tire comprising a base made in sections so that it may be flexible and conform to the curvature of the wheel rim of the automobile, the base being adapted to rest upon the flanges of the rim, and being provided with tread members and with blocks extending inward from the inner face of the base and adapted to rest upon the face of the rim between the flanges thereof and prevent lateral movement of the emergency tire when it is contracted in place.

A further object of the invention is to provide for a firm engagement between the tread members and the base and to provide a very simple means whereby the ends of the emergency tire may be connected to each other and contracted upon the rim of the wheel.

Other objects will appear in the course of the following description.

The invention is illustrated in the accompanying drawings, in which—

Figure 1 is a longitudinal sectional view of a portion of a wheel equipped with my improved emergency tire; Fig. 2 is a section on the line 2—2 of Fig. 1; Fig. 3 is a perspective view of one end of the emergency tire; Fig. 4 is a perspective view of the opposite end of the emergency tire.

Referring in detail to the drawings, it will be seen that my emergency tire comprises a base, as it may be termed composed of a plurality of sections, the sections being designated 10. These sections are hingedly connected to each other at their ends so that the entire base is flexible and is adapted to fit around and conform to the curvature of the wheel rim A. To this end, I preferably form each base of a strip of metal, the ends of the strips being bent to form hinge beads 11, the hinge beads of adjacent strips being held to each other by means of pintles 12. Each strip 10 has a slight curvature but is transversely flat and each strip 10 has a width greater than the outside width of the ordinary automobile wheel rim, as illustrated clearly in Fig. 2.

Attached to the inner face of each strip is a block 13 which is preferably of wood, but may be made of any other suitable material, each block being longitudinally curved to conform to the curvature of the strip 10 and being less in length than the strip and having its ends outwardly beveled, as at 14. This block 13 has a width less than that of the strip 10 and has a width substantially equal to the distance between the flanges of an ordinary automobile wheel rim so that the block may seat between the flanges and upon the face of the rim, as shown in Fig. 2.

Attached to the outer face of each strip 10 is a tread block 15 which is preferably of rubber or other suitable composition having like cushioning qualities and preferably the rubber is vulcanized with a strip 16 of fabric, such as canvas or like material, the edges of the strip being turned outward as at 17 so as to extend over the inner edges of the tread block. Preferably transverse metallic pins 17ᵃ pass through the out-turned edges of the fabric strip and through the rubber, locking the strip firmly to the rubber.

For the purpose of holding the tread block 15, the fabric strip 16 and the block 13 firmly to the base strip 10, I preferably provide bolts or screws which pass through the block 13 and into or through the tread block 15. As illustrated, both the tread block 15 and the block 13 are recessed or countersunk and the bolts 18 have heads disposed within the counter-sinks of the block 13 and at their outer ends have nuts 19 which are disposed within the recesses or counter-sinks within the tread block. I do not wish to be limited to this particular manner of connecting these elements together, inasmuch as the tread blocks and the blocks 13 may be connected to the base strip 10 in any suitable manner which will afford a firm engagement between the members and prevent any relative longitudinal or lateral movement.

A plurality of units each formed of a strip 10 with the corresponding tread block and block 13 are hinged to each other by pintles 12, as before described so as to form a flexible emergency tire adapted to be disposed over the rim of a wheel. In order to lock the emergency tire upon the rim of the wheel and contract it upon the wheel, I preferably form the base strip $10^a$ at one end of the emergency tire with the projecting extremities or terminal portions 20 which extend beyond the end of the corresponding tread block 15 and the corresponding block 13, as illustrated in Fig. 3. Riveted or otherwise attached to the strip $10^a$ are the strips 21 which also extend out beyond the corresponding tread block 15 and have the outwardly turned terminal ends 22 which are apertured. The base strip $10^b$ at the other end of the emergency tire does not project beyond the corresponding block 13, but is cut-away at its side margins as at 23 and riveted or otherwise attached to this base strip are the strips 24, whose extremities are turned outwardly as at 25 and apertured. Bolts 26 pass through the apertures of the outwardly turned ears 22 and 25 and by tightening up upon the nuts 27 of these bolts, the emergency tire may be drawn into close engagement with the periphery of the wheel rim. When so engaged, the blocks 13 will seat upon the inner face of the wheel rim and the base strips $10^a$ and $10^b$ will extend laterally over the flanges of the wheel rim. By forming the base of strips or sections 10 hinged to each other and by forming the blocks 13 of less strength than the base sections and beveled, the emergency tire may be readily folded so as to occupy but little space and thus can be readily carried within the car. By forming the tread blocks less in length than the base strips to which they are attached and beveling the ends of the blocks the tire may be expanded within reasonable limits to fit a relatively large wheel. The spaces between the blocks 13 permit the tire to be contracted to fit a wheel less in diameter than the normal diameter.

I have found in practice that this emergency tire is very convenient and thoroughly effective. By using it, all strain is taken from the flanges of the wheel rim so that there is no danger in running upon the rim, as is the case where the tire is deflated.

Having thus described this invention, what I claim is:—

1. In an emergency tire, a flexible base composed of a plurality of sections having hinged engagement with each other, a plurality of tread elements each attached to the outer face of one of said sections and less in length than the sections, a plurality of rim engaging elements each attached to the inner face of one of said sections and less in length than said sections, and means for contracting or expanding the tire.

2. An emergency tire comprising a plurality of metallic strips having hinged engagement with each other, tread elements each attached to one of said strips, each element comprising a layer of fabric, and a resilient block engaged with the fabric, the outer face of the block being recessed, a plurality of rim engaging elements each comprising a longitudinally extending block attached to the inner face of the corresponding strip, and each element being recessed upon its inner face, bolts having heads disposed in said recesses passing through the rim engaging elements, the strips and the tread elements, and having nuts disposed in the recesses of the tread elements, and means whereby the tire may be expanded or contracted.

3. In an emergency tire, a flexible base comprising a plurality of metallic strips hingedly secured to each other, a plurality of tread elements disposed each against the outer face of one of said strips, a plurality of rim engaging elements each disposed against the inner face of one of said strips and less in width than the strips, means operatively engaging each rim engaging element, corresponding strip and corresponding tread element with each other, and means for contracting or expanding the tire, the tread elements and the rim engaging elements having beveled ends, whereby the tire may be expanded or contracted to fit different sized wheels.

4. In an emergency tire, a flexible base comprising a plurality of metallic sections hingedly secured to each other, a plurality of tread elements each attached to the outer face of one of said sections, a plurality of rim engaging elements each attached to one of said sections, the section at one end of the flexible base having laterally disposed extensions projecting beyond the ends of the corresponding tread element and ring engaging element, said section having outwardly turned ears disposed adjacent the end of the tread element, the section at the opposite end of the base being cut away on its side margins to accommodate the extensions of the first-named section and being provided with outwardly turned ears, and means engaging said ears for contracting the tire upon a wheel.

In testimony whereof I hereunto affix my signature in the presence of two witnesses.

VERN E. REICHARD.

Witnesses:
MAE HALL,
ALICE SMITH.